(12) United States Patent
Smoker (10) Patent No.: US 9,938,021 B2
(45) Date of Patent: Apr. 10, 2018

(54) LAUNCHED AIR VEHICLE SYSTEM (71) Applicant: Lockheed Martin Corporation, Bethesda, MD (US)

(72) Inventor: Thomas William Smoker, Hants (GB)

(73) Assignee: Lockheed Martin Corporation, Bethesda, MD (US)

( * ) Notice: Subject to any disclaimer, the term of this patent is extended or adjusted under 35 U.S.C. 154(b) by 84 days.

(21) Appl. No.: 14/294,073

(22) Filed: Jun. 2, 2014

(65) Prior Publication Data
US 2015/0008280 A1    Jan. 8, 2015

(30) Foreign Application Priority Data

Jun. 3, 2013 (GB) .................................. 1309841.3

(51) Int. Cl.
| | |
|---|---|
| *B64F 1/04* | (2006.01) |
| *B63G 8/38* | (2006.01) |
| *F41F 3/07* | (2006.01) |
| *F41F 3/10* | (2006.01) |
| *B63G 8/00* | (2006.01) |
| *B63G 8/30* | (2006.01) |

(52) U.S. Cl.
CPC ............... *B64F 1/04* (2013.01); *B63G 8/001* (2013.01); *B63G 8/30* (2013.01); *B63G 8/38* (2013.01); *F41F 3/07* (2013.01); *F41F 3/10* (2013.01); *B64C 2201/08* (2013.01); *B64C 2201/205* (2013.01)

(58) Field of Classification Search
CPC .. B64F 1/04; B64F 2201/205; B64F 2201/08; F41F 3/00; F41F 3/07; F41F 3/055; F42B 10/14

USPC ................ 89/1.809, 1.81; 114/316
See application file for complete search history.

(56) References Cited

U.S. PATENT DOCUMENTS

| | | | | |
|---|---|---|---|---|
| 3,499,364 | A * | 3/1970 | Ooge ........................ | F41F 3/07 89/1.81 |
| 4,033,225 | A * | 7/1977 | Kartzmark, Jr. ......... | F42B 15/20 89/1.81 |
| 5,042,390 | A * | 8/1991 | Schotter .................. | F41F 3/055 102/504 |
| 5,170,005 | A * | 12/1992 | Mabry ...................... | F41F 3/07 89/1.11 |

(Continued)

*Primary Examiner* — Peter M Poon
*Assistant Examiner* — Magdalena Topolski
(74) *Attorney, Agent, or Firm* — Wolf, Greenfield & Sacks, P.C.

(57) ABSTRACT

A launch canister for ejection from a submerged launch platform, the launch canister being adapted for ejection in a direction substantially along a first axis of the launch canister and comprising: an enclosure for carrying a UAV; a nose cap releasably located in a launch opening at a forward end of the launch canister; a launch mechanism for driving a UAV carried in the enclosure out of the launch canister through the launch opening in a direction substantially along said first axis; and a water surface sensor for detecting when the nose cap of the canister broaches the surface of the water; wherein the launch canister is configured to, on the water surface sensor detecting that the nose cap of the canister has broached the surface of the water, immediately release the nose cap and initiate the launch mechanism to drive a UAV carried in the enclosure out of the launch canister through the launch opening.

19 Claims, 4 Drawing Sheets

(56) References Cited

U.S. PATENT DOCUMENTS

| | | | |
|---|---|---|---|
| 5,542,333 A * | 8/1996 | Hagelberg | F41F 3/07 |
| | | | 220/378 |
| 5,615,847 A * | 4/1997 | Bourlett | F42B 10/14 |
| | | | 114/316 |
| 6,164,179 A | 12/2000 | Buffman | |
| 6,224,013 B1 * | 5/2001 | Chisolm | F42B 10/14 |
| | | | 244/3.27 |
| 6,286,410 B1 | 9/2001 | Leibolt | |
| 6,868,769 B1 * | 3/2005 | Wright | F41A 19/68 |
| | | | 89/1.804 |
| 7,249,567 B1 | 7/2007 | Wallin | |
| 7,946,241 B2 | 5/2011 | Sampson et al. | |
| 8,091,461 B1 | 1/2012 | Buescher | |
| 2004/0031381 A1 * | 2/2004 | Williams | F41F 3/07 |
| | | | 89/1.809 |
| 2009/0107386 A1 | 4/2009 | Sampson et al. | |
| 2011/0073707 A1 | 3/2011 | Bossert et al. | |
| 2012/0001020 A1 * | 1/2012 | Miralles | B64C 39/024 |
| | | | 244/63 |
| 2012/0068009 A1 * | 3/2012 | Bossert | F41F 3/07 |
| | | | 244/63 |
| 2012/0068010 A1 | 3/2012 | Bossert et al. | |
| 2012/0205488 A1 * | 8/2012 | Powell | B64C 39/024 |
| | | | 244/63 |
| 2013/0092790 A1 * | 4/2013 | Geswender | F42B 10/14 |
| | | | 244/63 |
| 2016/0054097 A1 * | 2/2016 | Sylvia | B63G 8/001 |
| | | | 124/73 |
| 2016/0178317 A1 * | 6/2016 | Powell | F41F 3/07 |
| | | | 89/1.81 |
| 2016/0347476 A1 * | 12/2016 | Andryukov | B64C 39/024 |

\* cited by examiner

LAUNCHED AIR VEHICLE SYSTEM

FOREIGN PRIORITY CLAIM

Priority based on British Patent Application Serial No. GB 1309841.3 filed Jun. 3, 2013, and entitled "LAUNCHED AIR VEHICLE SYSTEM" is claimed. Moreover, the entirety of the previous provisional application, including the drawings, is incorporated herein by reference as if set forth fully in the present application.

FIELD

This invention relates to a launch canister for providing a UAV into airspace above a submerged launch platform.

BACKGROUND

Launching unmanned aerial vehicles (UAVs) from a submarine whilst the submarine is submerged poses a difficult problem. Conventional launch solutions that might be used on land or on ships are not suitable for use on submarines because they are designed to launch UAVs into clear air, not through a layer of water. Furthermore, UAVs are not typically designed for travel through water and could be damaged if launched into water.

Systems for launching UAVs from a submarine are currently in development. The first of these, Gabler's VOLANS system avoids the problem of launching through water by providing a dedicated submarine mast from which a UAV can be unfolded and launched using a catapult (the UAV hence being above the surface of the water on launch). However, this system requires a submarine to be heavily modified so as to carry the additional launch mast. It is also limited in that the submarine can be no deeper than periscope depth with the launch mast being required to break through the surface of the water in order to launch its UAV.

Raytheon Company of Waltham (MA), US, is also developing a UAV launch system for submarines, SOTHOC, which makes use of a submarine launch vehicle adapted for ejection from the garbage ejector of a submarine. The submarine launch vehicle carries the UAV to the surface by inflating a float collar and then makes use of a water drogue and vane to stabilise and align a launch tube at a 35 degree angle into the wind. The UAV is launched from the launch tube of the submarine launch vehicle by means of a conventional launch mechanism. Whilst the SOTHOC system allows a UAV to be launched while the submarine is submerged, the system suffers from the problems that many modern submarines do not have garbage ejector systems and the system is unreliable in rough seas. Furthermore, garbage ejector guns are reliant on the ability to drain down the water from inside the ejector to an internal waste water tank. If the tank is full or near to full then the internal waste water tank will have to be pumped overboard, which is a noisy procedure and might not therefore be possible if the submarine is to maintain a low acoustic signature. U.S. Pat. No. 7,946,241 discloses more detail of the floatable housing for deployment of an unmanned aerial vehicle adapted to be launched from a marine vessel.

A third system, the Lockheed Martin Cormorant, has previously been proposed at a conceptual level. The Cormorant was a 4-ton UAV having folding wings so as to allow it to fit into a Trident missile tube. In order to launch the Cormorant UAV, it was not fired from the tube but guided out on a "saddle" at a depth of 150 feet and left to float to the surface, during which time it unfolded its wings. The UAV's rockets were then used to lift the UAV away from the water surface and into flight. Due to its cost this project was not pursued.

There is therefore a need for improved apparatus for launching UAVs from a submarine.

SUMMARY

According to an aspect, there is provided a launch canister for ejection from a submerged launch platform, the launch canister being adapted for ejection in a direction substantially along a first axis of the launch canister and comprising: an enclosure for carrying a UAV; a nose cap releaseably located in a launch opening at a forward end of the launch canister; a launch mechanism for driving a UAV carried in the enclosure out of the launch canister through the launch opening in a direction substantially along said first axis; and a water surface sensor for detecting when the nose cap of the canister broaches the surface of the water; wherein the launch canister is configured to, on the water surface sensor detecting that the nose cap of the canister has broached the surface of the water, immediately release the nose cap and initiate the launch mechanism to drive a UAV carried in the enclosure out of the launch canister through the launch opening.

According to another aspect, there is provided a method for launching an unmanned aerial device from a submerged launch platform, the method comprising: ejecting a launch canister carrying an unmanned aerial vehicle in an enclosure thereof in a direction substantially along a first axis of the launch canister, detecting a nose cap located in a launch opening of the launch canister broaching the surface of the water, in response to detecting the nose cap broaching the surface of the water, immediately releasing the nose cap and initiating a launch mechanism to drive the unmanned aerial vehicle out of the launch canister through the launch opening, and driving the unmanned aerial vehicle out of the launch canister by the launch mechanism through the launch opening in a direction substantially along said first axis.

According to a yet further aspect, there is provided a computer program comprising code means adapted to control, when run on processor apparatus, operations in association with launch of an unmanned aerial device from a submerged launch platform, the operations comprising: receiving a signal indicating that a nose cap located in a launch opening of a launch canister carrying the unmanned aerial vehicle and ejected in a direction substantially along a first axis of the launch canister has broached the surface of the water; in response to the signal, immediately causing release of the nose cap and initiation of a launch mechanism to drive the unmanned aerial vehicle out of the launch canister through the launch opening; and causing driving of the unmanned aerial vehicle out of the launch canister by the launch mechanism through the launch opening in a direction substantially along said first axis.

Preferably the launch mechanism is a high pressure gas charge.

Suitably the launch mechanism is initiated in response to the nose cap being released.

Suitably the nose cap is connected to the launch canister by means of a sprung hinge, said hinge being biased so as to rotate the nose cap away from the launch opening when the nose cap is released. Alternatively, the nose cap is connected to the launch canister by means of one or more explosive pins, the nose cap being released from the launch opening by firing the explosive pins so as to drive the nose cap away from the launch opening.

Suitably the launch mechanism is an explosive or high pressure gas charge and the nose cap is connected to the launch canister by one or more mechanical locks, the nose cap being released from the launch opening by releasing the locks and allowing the gas developed by the explosive or high pressure gas charge to drive the nose cap from the launch canister.

Preferably the nose cap is configured to make a watertight fit with the launch opening so as to prevent the ingress of water into the enclosure during the passage of the launch canister through water.

Preferably the water surface sensor comprises at least one of a hydrostatic switch, a pressure switch, electronic switch, and an electro optical switch.

The launch canister suitably further comprises one or more guide elements adapted to direct the motion of the launch canister towards the water surface at a preferred launch angle.

Suitably the one or more guide elements include steer-away fins or a flotation device.

The launch canister preferably further comprises a first lanyard fixedly attached at one end to an external part of the launch canister and having its other end adapted for detachable connection to a submerged launch platform, the launch canister being configured such that, when the launch canister is ejected from a submerged launch platform, the one or more guide elements move from a stowed to a deployed position on the first lanyard pulling taut at a first extension of the first lanyard, the first extension of the first lanyard being such that the one or more guide elements are deployed on the launch canister fully exiting the submerged launch platform. Preferably the first lanyard is configured to detach from the submerged launch platform on the first lanyard pulling taut at a second extension of the first lanyard.

Suitably the one or more guide elements are configured to automatically deploy on exit from the launch mechanism.

Suitably the launch mechanism comprises a launch tube from which the launch canister is ejected, the one or more guide elements including spring-loaded steer-away fins arranged to spring into a deployed position on exiting the confined space of the launch tube.

Suitably the launch mechanism comprises a launch tube from which the launch canister is ejected, the one or more guide elements including a flotation collar and the launch canister comprising a switch mechanism arranged to cause the flotation collar to inflate on the launch canister exiting the confined space of the launch tube.

The launch canister preferably further comprises a second lanyard attached at one end in the enclosure and having its other end adapted for detachable connection to a UAV, wherein the length of the second lanyard is selected such that, when a UAV connected to the second lanyard is driven from the launch canister, the second lanyard pulls taut and detaches from the UAV as the engine of the UAV passes through the launch opening. Preferably said other end of the second lanyard is adapted to cause an engine of the UAV to power up on pulling taut and detaching from the UAV.

Suitably the enclosure is adapted for carrying a UAV having stowed wings, the enclosure including one or more guide pieces for guiding the passage of stowed wings of a UAV on such UAV being driven from the launch canister.

Suitably the submerged launch platform is a submarine. Suitably the launch canister is adapted for launch from a Submerged Signal Ejector tube or an Under Casing Launcher.

BRIEF DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a canister adapted for ejection through water and carrying a UAV for delivery into the airspace above the submerged launch platform, which could be a boat, submarine, Swimmer Delivery Vehicle (SDV) or other submerged structure. A launch canister as described herein could be adapted for ejection from any kind of underwater launch apparatus, but it is particularly advantageous if a launch canister configured in accordance with the present invention is adapted for ejection from a Submerged Signal Ejector (SSE) or Under Casing Launcher (UCL) present in modern submarines. Such launch mechanisms allow rapid deployment of equipment whilst submerged without tying up missile or torpedo launch tubes. In the examples given herein it will be assumed that the launch platform is a submarine.

It is envisaged that a launch canister of the present invention would be launched from a submarine at approximately periscope depth. However, since the launch mast does not need to be raised the submarine can remain entirely submerged.

Figure 1:
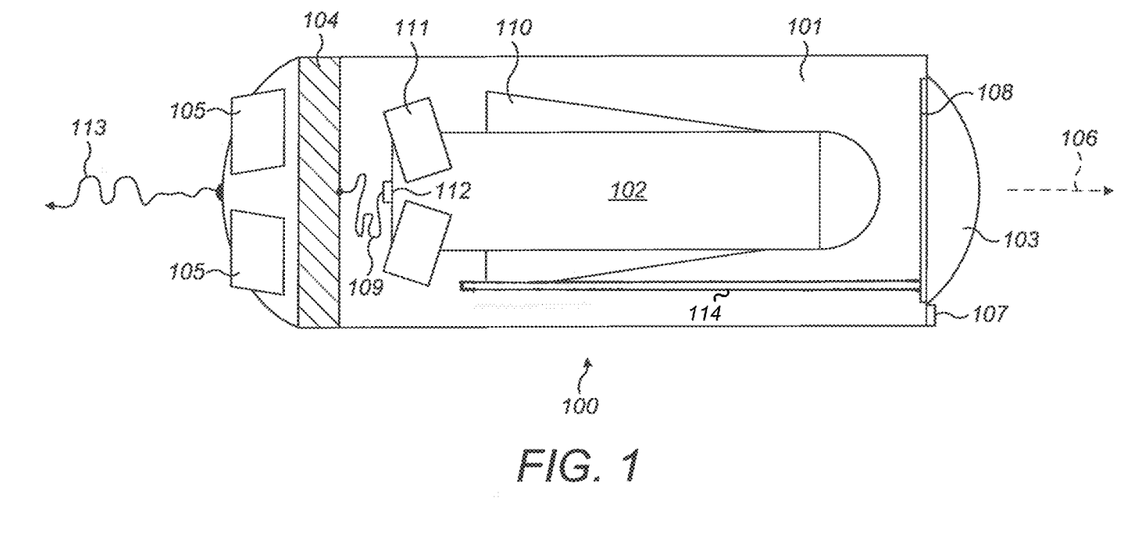
FIG. 1 is a schematic diagram of a launch canister configured in accordance with the present invention.
Figure 2A:
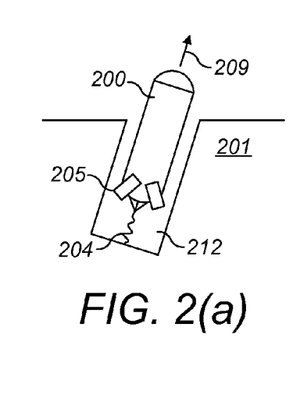
FIG. 2 is an illustration of a UAV launch by means of a launch canister configured in accordance with the present invention.
Figure 2B:
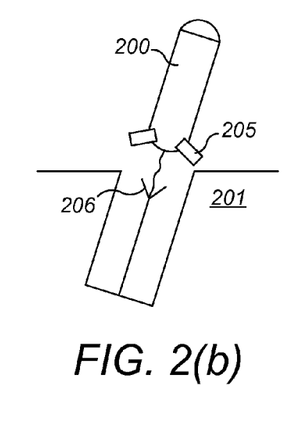
Figure 2C:
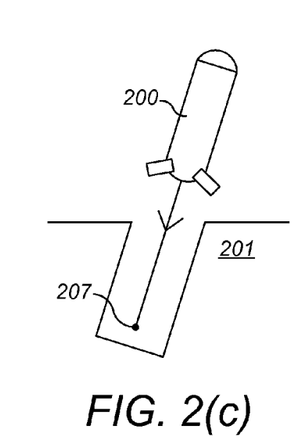
Figure 2D:
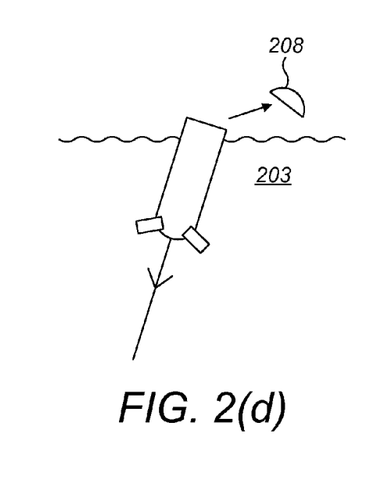
Figure 2E:
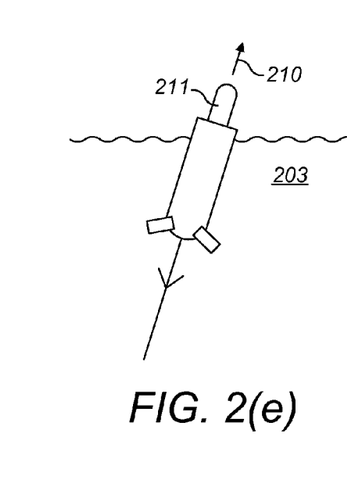

A launch canister for a UAV configured in accordance with the present invention is shown in FIG. 1. The launch canister 100 comprises a watertight enclosure 101 adapted to carry an Unmanned Aerial Vehicle (UAV) 102. UAV 102 would preferably have stowable wings 110 and tail planes 111 so as to allow the UAV to adopt a compact configuration that makes efficient use of space in enclosure 101. The wings could, for example, be of a switchblade or wrap-around design. The UAV propeller could also be foldable. Since the external diameter of the launch canister is constrained by the particular requirements of the mechanism by which it is launched, such spacing-saving features permit a UAV to be carried in launch canisters smaller than the size of the UAV with all its flight surfaces deployed.

Enclosure 101 is closed off by a nose cap 103 which makes a watertight seal in launch opening 108. Nose cap 103 is configured to uncover launch opening 108 in order to allow UAV 102 to be launched out of its enclosure. This could be achieved in any number of ways, for example:

i. the nose cap could be mounted to the launch canister by a sprung hinge that is biased such that when the nose cap is released the nose cap flips away from the launch opening by rotating about the hinge;

ii. the nose cap could be connected to the launch canister by means of one or more explosive pins arranged to, on their activation, jettison the nose cap;

iii. the nose cap could be held in place by means of one or more locks, those locks being released immediately prior to launch of the UAV so as to allow the UAV to push the nose cap out of the way as it exits the canister (in the case that the UAV is driven out of the canister by an explosive or compressed gas charge it could be the rapidly expanding gas itself that pops of the nose cap);

iv. the nose cap could comprise a waterproof diaphragm through which the UAV is forced on being driven from the launch canister—in this case there need not be any explicit release of the nose cap since it stays in place during launch, but the canister could additionally include a further protective nose cap over the diaphragm that is released on the canister broaching the water surface.

Launch canister 100 includes a launch mechanism 104 arranged to drive the UAV out of the canister through launch opening 108. Launch mechanism 104 could be any suitable kind of mechanism for launching the UAV, including a mechanical device (e.g. a catapult or other sprung mechanism), an explosive charge, or a compressed gas charge. Preferably the launch mechanism is a compressed gas charge since this can be stored in a quiescent state for long periods of time, has a lower acoustic signature than an explosive charge, and means that the canister need not be handled as an explosive, which improves platform safety.

The launch canister itself is designed to be ejected from a submarine, typically from a launch tube using a compressed gas charge or an air/water ram discharge mechanism. Irrespective of the particular means by which the canister is launched, the launch canister is adapted to be launched nose cap first in a direction substantially commensurate with the direction in which the UAV is to be launched out of the canister. This direction is indicated by arrow 106 in FIG. 1 and is defined relative to the canister, not its launch platform.

Launch canister 100 further comprises a surface sensor 107 for detecting when the nose cap reaches the surface of the water. The surface sensor could be any kind of suitable sensor, such as a hydrostatic switch, or an electronic sensor for detecting the transition from water to air. Other examples include a pressure switch or an electro-optical sensor for detecting the transition from water to air can be provided. On the surface sensor detecting the water surface, the nose cap of the launch canister is released in accordance with whichever mechanism the nose cap is attached to the canister (e.g. by releasing one or more electronic locks, activating one or more explosive pins etc.).

In accordance with a possibility, a launch canister may have an on-board fitted Inertial Measurement Unit (IMU) to detect the motion of the launch canister. The IMU can signal canister motion data to control electronics of the UAV to assist in the discharge initiation sequence and subsequent ejection of the UAV from the canister. Furthermore, a positioning system unit may also be provided in the UAV and/or in the canister. For example, the UAV may comprise a Global Positioning System (GPS) receiver. The canister motion data along with the GPS receiver acquiring a GPS satellite lock can be used to determine when the canister has surfaced and the UAV is ready for the on-board control system electronics to initiate a discharge sequence from the enclosure.

The launch canister may optionally further comprise a UAV lanyard 109 connected between the UAV and the launch canister. This provides a means for causing the engine of the UAV to initiate at the correct moment. Lanyard 109 is detachable from the UAV at switch 112 on the lanyard pulling taut at its maximum extension. Switch 112 is preferably used to activate the UAV engine so as to cause the UAV to enter powered flight. Thus, on the lanyard pulling taut at its maximum extension, switch 112 activates the UAV engine and the lanyard detaches from the switch mechanism. Switch 112 could be any type of mechanical or electrical switch. Most preferably, the length of the lanyard is selected such that it pulls taut and activates the UAV engine as the engine of the UAV emerges through the launch opening. This allows the UAV to achieve cruise speed (typically 25-30 knots) by the time the wings are fully deployed. For example, if the UAV has a nose-mounted propeller engine, the lanyard length is selected so as to cause the engine to activate as the nose of the UAV exits through the launch opening of the canister.

Alternatively, the UAV includes a switch that is engaged by the action of the UAV wings being deployed as the UAV exits the canister, engagement of the switch causing the UAV engine to power up. Preferably the switch would be engaged on the UAV wings locking into position at full deployment.

It is advantageous if lanyard 109 is further configured to provide power and/or data to the UAV. This allows initialisation and navigation data to be uploaded to the UAV prior to its launch.

On the UAV being ejected from the launch canister, the wings and/or tail planes of the UAV are deployed. This is preferably achieved by having the wings and/or tail planes sprung such that they extend into their flight configuration on exiting the confines of the enclosure. The wings and/or tail would preferably then lock into their flight position, for example through the use of one or more locking pins. Alternatively, lanyard 109 is used to trigger the extension of the wings and/or tail planes as well as the engine of the UAV. For example, the wings and/or tail planes could be sprung such that they extend into their flight configuration on the lanyard pulling taut and releasing a pin locking the wings and/or tail planes in their stowed configuration. The launch canister could further comprise one or more guide pieces 114, such as rails or a base, expanding or cup type sabot, for guiding the wings and/or tail planes of the UAV as it passes out of the enclosure and ensuring that the UAV enters flight without significant rotation.

The launch canister may further comprise a second lanyard 113 for connection between the launch canister and the launch platform (e.g. a submarine launch tube). The second lanyard can be used to activate guide elements of the launch canister. For example, it can be advantageous to equip the launch canister with "steer-away" fins 105 arranged so as to, when deployed, direct the travel of the canister through the water away from the launch platform (e.g. a submarine) and/or ensure that the launch canister arrives at the water surface at the optimal angle for launch of the UAV. The steer-away fins could be activated on lanyard 113 pulling taut when it achieves its maximum extension. For example, this could result in one or more shear pins holding the steer-away fins in a stowed configuration shearing so as to cause the fins to be deployed (e.g. the fins could be sprung so as to deploy on the shear pins being removed).

In order to avoid lanyard 113 being left trailing from the launch tube from which the canister is ejected, the lanyard preferably activates the guide elements when it initially pulls taut but then subsequently detaches from the launch platform at the launch platform end of the lanyard such that the lanyard escapes the launch platform with the canister. This can be achieved by having one or more shear pins or switches at the canister that activate/release at a lower force than the release means at the launch platform end of the lanyard, with the lanyard remaining connected to the launch canister on the one or more shear pins or switches being activated/released. The release of the steer-away fins and the detachment of the lanyard from the launch tube can be staggered through the use of additional branches of the lanyard pieces at the launch canister, as discussed below in relation to FIG. 2.

Additionally or alternatively, the launch canister could comprise one or more float devices to aid the launch canister in achieving an optimal launch angle for the UAV at the water's surface. Inflation of the float devices could be triggered by the second lanyard in a similar manner. In certain embodiments, the second lanyard could also be used to complete power and/or data paths between the launch platform and the UAV.

An exemplary mechanism for launching a canister configured in accordance with the present invention will now be discussed in relation to FIG. 2, which shows five phases of a UAV launch. In phase (a), a launch canister 200 is ejected in direction 209 by a compressed gas charge from an SSE launch tube 212 of submarine 201 whilst the submarine is submerged (typically at a depth that allows radio communication between submarine and UAV once the UAV is airborne). A lanyard 204 is connected between the launch canister and launch tube.

At phase (b), the lanyard extends to a predetermined length at which lanyard branch pieces 206 pull taut and shears pins securing sprung steer-away fins 205 in a stowed position, allowing the steer-away fins to spring and lock into a deployed position. The remote end 207 of lanyard 204 then detaches from the launch tube 212 at phase (c) in response to the main length of lanyard 204 pulling taut at a second predetermined length. The steer-away fins act to guide the canister's motion away from the submarine so as to avoid collision with any parts of the submarine and ensure that the canister maintains a good orientation for launching its UAV payload.

At phase (d), the launch canister reaches the surface of the water 203 and its water surface sensor (not shown in FIG. 2) causes the nose cap 208 to be jettisoned and the compressed gas launch mechanism of the canister to drive the UAV 211 from the canister. As the UAV clears the launch canister, its wings and tail planes spring and lock into their deployed positions and the engine of the UAV powers up.

It can be seen in phase (e) that the direction 210 in which the UAV is launched is, in the frame of the canister, substantially in the same direction as direction 209 in which the canister itself was ejected from the launch tube. The canister's momentum from its ejection therefore aids the launch of the UAV and helps give the UAV sufficient speed (typically at least 12.5 m/s) to achieve flight well above the swell of the sea whilst the UAV engine powers up.

Figure 3:
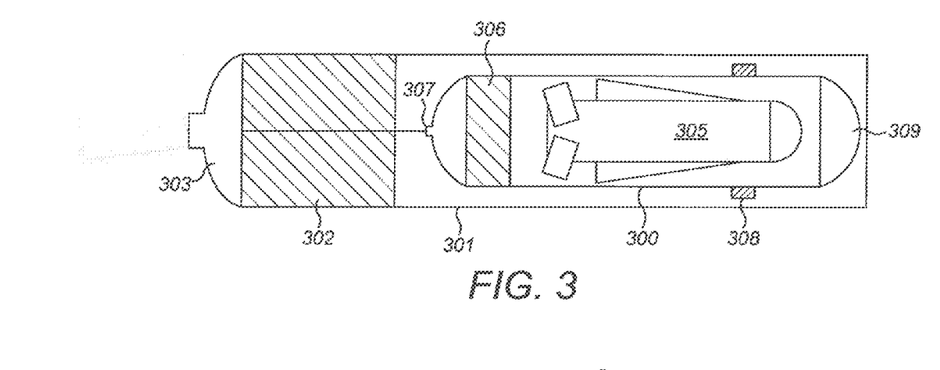
FIG. 3 is a schematic diagram of a launch canister configured in accordance with the present invention and located in an Under Casing Launcher.

FIG. 3 shows a launch canister adapted for launch from an Under Casing Launcher (UCL) of a submarine. UCLs are launch devices provided outside the pressure hull of a submarine and configured to eject a payload from a launch tube 301 adapted to withstand the dive pressures experienced by a submarine hull. In FIG. 3, the UCL carries a launch canister 300 configured in accordance with the present invention and which in turn carries a UAV 305.

UCL 301 includes a compressed gas charge 302 for ejecting the launch canister from the tube and an end piece 303 having an electrical connector for connection to the submarine by means of which power and/or data can be provided to the UCL. Launch canister 300 comprises an electrical connector 307 for connection to the UCL and hence to the submarine. In this manner the UAV can be charged and/or initialisation and navigation data uploaded to the UAV. The electrical connection to the launch canister could be provided by a lanyard 113 as discussed in relation to FIG. 1, but preferably a canister adapted for launch from a UCL does not included a lanyard for tethering to the UCL. This is because, due to the location of the UCL tubes on a submarine, steer-away fins are generally not necessary to steer the launch canister away from the submarine. A simple flotation collar 308 can instead be used to guide the motion of the launch canister to the surface and also improve its buoyancy, which allows heavier UAVs to be launched by the mechanisms described herein.

Launch canister 300 operates to launch its UAV in the same manner as launch canister 100, with a launch mechanism 306 (e.g. a compressed gas charge) being used to eject the UAV from the launch canister, and nose cap 309 being released to allow the UAV to exit the canister on broaching the surface of the water. An exemplary launch of a UAV using launch canister 300 will now be described with reference to FIG. 4.

Figure 4:
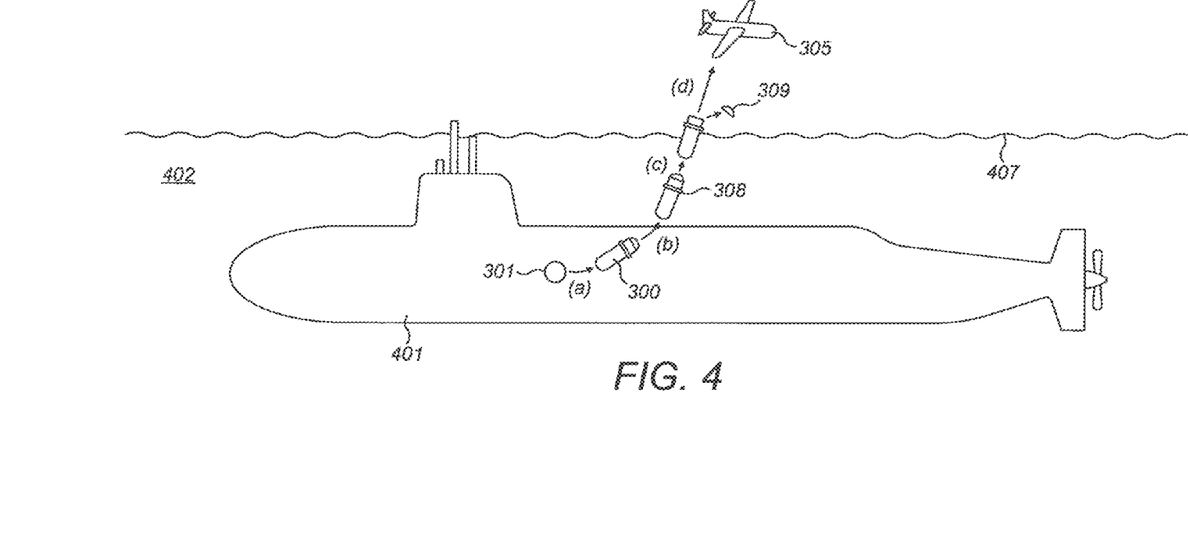
FIG. 4 is an illustration of a UAV launch by means of a launch canister configured in accordance with the present invention and ejected from an Under Casing Launcher.

FIG. 4 shows a submarine 401 at periscope depth beneath the water surface 407 and comprising an Under Casing Launcher 301. Launch canister 300 is ejected from the UCL at phase (a) with its subsequent motion in phase (b) through water 402 to the surface being guided by flotation collar 308 whose inflation could be activated on launch of the canister (e.g. by means of a hydrostatic switch). At phase (c) the launch canister broaches the surface 407 and in response a surface sensor causes nose cap 309 to be jettisoned. Further in response to broaching the surface of water 402, UAV 305 is launched from the canister and hence driven into the air where it enters flight mode and powers away to complete its mission.

Whether ejected from an SSE or a UCL, a launch canister according to the present invention therefore operates according to the same principles, but it has been found that the preferred guidance mechanisms (e.g. the use of steer-away fins or flotation devices) employed differ. More generally, however, any of the features of a launch canister described herein in relation to any of the figures can be used in any combination with any other features. The launch canisters and stepwise launch procedures described herein are merely illustrative and represent preferred embodiments of the present invention. For example, launch canisters according to the present invention could use both steer-away fins and floats to guide the passage of the canister through water, or neither such guide elements.

Figure 5:
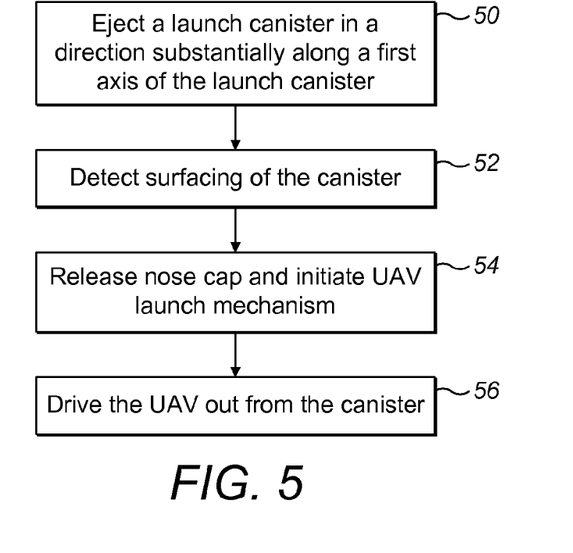
FIG. 5 is a flowchart according to one embodiment.

FIG. 5 is a flowchart for ejection of a launch canister from a submerged launch platform. The launch canister is ejected at 50 in a direction substantially along a first axis of the launch canister. At 52 a detection when a nose cap located in a launch opening of the launch canister broaches the surface of the water is made. At 54, in response to the water surface sensor detecting at 52 that the nose cap of the canister has broached the surface of the water, the nose cap is released and a launch mechanism is initiated to drive a unmanned aerial vehicle carried in an enclosure of the launch canister out of the launch canister through the launch opening. The unmanned aerial vehicle is then driven out of the launch canister at 56 by the launch mechanism through the launch opening in a direction substantially along said first axis.

The launch canister and/or the unmanned aerial vehicle (UAV) can be provided with appropriate control electronics. The control electronics can comprise apparatus with at least one processor and at least one memory configured to cause performance of the functions of the launch canister and/or the UAV. A computer program comprising code means adapted to control, when run on the apparatus can control operations in association with launch of the unmanned aerial device from a submerged launch platform. More particularly, the apparatus can receive a signal indicating that a nose cap located in a launch opening of a launch canister carrying the unmanned aerial vehicle and ejected in a direction substantially along a first axis of the launch canister has broached the surface of the water, and in response to the signal, immediately cause release of the nose cap and initiation of a launch mechanism to drive the unmanned aerial vehicle out of the launch canister through the launch opening. The apparatus can further cause and/or control driving of the unmanned aerial vehicle out of the launch canister by the launch mechanism through the launch opening in a direction substantially along said first axis.

Figure 6:
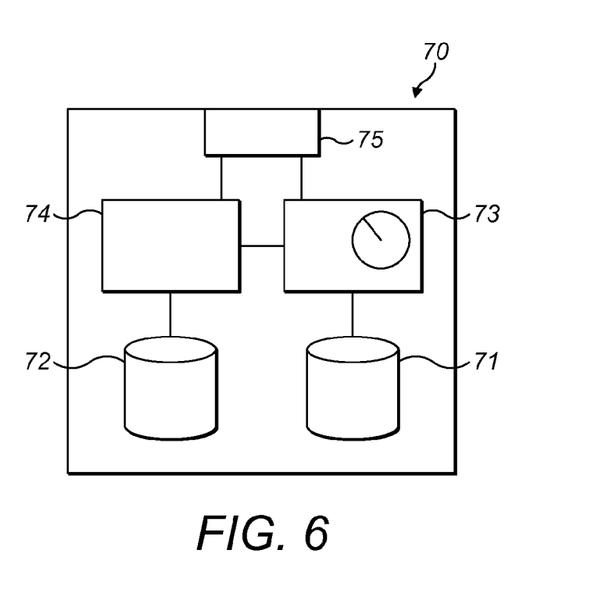
FIG. 6 shows a control apparatus.

FIG. 6 shows an example of a control apparatus 70 for a UAV and/or for a launch canister. The control apparatus can be configured to provide control functions in association with the above described launch operation. For this purpose the control apparatus comprises at least one memory 71, 72, at least one data processing unit 73, 74, and an input/output interface 75. Via the interface the control apparatus can be coupled to at least one external sensor and at least one other control apparatus. The control apparatus can be configured to execute an appropriate software code to provide the control functions. The required data processing apparatus and functions may be provided by means of one or more data processors. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A launch canister for ejection from a submerged launch platform, the launch canister being adapted for ejection in a direction substantially along a first axis of the launch canister and comprising: an unmanned aerial vehicle (UAV); an enclosure adapted for carrying the UAV; a nose cap releasably located in a launch opening of the enclosure;

a launch mechanism adapted for driving, aided by momentum from the ejection of the canister in the direction substantially along the first axis, the UAV out of the enclosure through the launch opening in the direction substantially along said first axis; a water surface sensor adapted for detecting when the nose cap of the canister broaches a water surface; a nose cap release mechanism adapted for immediately releasing the nose cap upon detection that the nose cap of the canister has broached a water surface by the water surface sensor; and a lanyard attached at one end in the enclosure, the lanyard having a second end adapted for detachable connection to an engine of the UAV, wherein the length of the lanyard is selected such that the lanyard is adapted to pull taut and detach from the UAV as the engine of the UAV passes through the launch opening; wherein said second end of the lanyard is adapted to cause the engine of the UAV to power up when pulling taut and detaching from the UAV.

2. The launch canister as claimed in claim 1, wherein the launch mechanism is an explosive or high pressure gas charge.

3. The launch canister as claimed in claim 1, wherein the launch mechanism is initiated in response to the nose cap being released.

4. The launch canister as claimed in claim 1, wherein
the nose cap release mechanism comprises a sprung hinge connecting the nose cap to the enclosure, said hinge being biased so as to rotate the nose cap away from the launch opening when the nose cap is released.

5. The launch canister as claimed in claim 1, wherein the nose cap release mechanism comprises one or more explosive pins connecting the nose cap to the enclosure, the nose cap being released from the launch opening by firing the one or more explosive pins so as to drive the nose cap away from the launch opening.

6. The launch canister as claimed in claim 1, wherein the launch mechanism is an explosive or high pressure gas charge and the nose cap is connected to the enclosure by one or more mechanical locks, the nose cap release mechanism being configured to release the one or more mechanical locks and allow the gas developed by the explosive or high pressure gas charge to drive the nose cap from the enclosure.

7. The launch canister as claimed in claim 1, wherein the nose cap is configured to make a watertight fit with the launch opening so as to prevent ingress of water into the enclosure during passage of the launch canister through water.

8. The launch canister as claimed in claim 1, wherein the water surface sensor comprises at least one of a hydrostatic switch, a pressure switch, an electronic switch, and an electro optical switch.

9. The A launch canister as claimed in claim 1, further comprising one or more guide elements adapted to direct motion of the launch canister towards the water surface at a preferred launch angle.

10. The launch canister as claimed in claim 9, wherein the one or more guide elements include steer-away fins or a flotation device.

11. The launch canister as claimed in claim 9, the launch mechanism further comprising a launch canister launch mechanism, wherein the one or more guide elements are configured to automatically deploy upon exit from the launch canister launch mechanism.

12. The launch canister as claimed in claim 11, wherein the launch canister launch mechanism comprises a launch tube from which the launch canister is ejected, the launch tube defining a confined space, the one or more guide elements including spring-loaded steer-away fins arranged to spring into a deployed position upon exiting the confined space of the launch tube.

13. The launch canister as claimed in claim 11, wherein the launch canister launch mechanism comprises a launch tube from which the launch canister is ejected, the launch tube defining a confined space, the one or more guide elements including a flotation collar and the launch canister comprising a switch mechanism arranged to cause the flotation collar to inflate on the launch canister exiting the confined space of the launch tube.

14. The launch canister as claimed in claim 1, wherein the enclosure is adapted for carrying the UAV having stowed wings, the enclosure including one or more guide pieces for guiding passage of the stowed wings of the UAV when the UAV is driven from the enclosure.

15. The launch canister as claimed in claim 1, wherein the submerged launch platform is a submarine.

16. The launch canister as claimed in claim 15, wherein the launch canister is adapted for launch from a Submerged Signal Ejector tube or an Under Casing Launcher.

17. A launch canister for ejection from a submerged launch platform, the launch canister being adapted for ejection in a direction substantially along a first axis of the launch canister and comprising:
   an enclosure for carrying an unmanned aerial vehicle (UAV);
   a nose cap releasably located in a launch opening at a forward end of the launch canister;
   a launch mechanism for driving a UAV carried in the enclosure out of the launch canister through the launch opening in the direction substantially along said first axis;
   a water surface sensor for detecting when the nose cap of the canister broaches a water surface;
   wherein the launch canister is configured to, on the water surface sensor detecting that the nose cap of the canister has broached a water surface, immediately release the nose cap and initiate the launch mechanism to drive a UAV carried in the enclosure out of the launch canister through the launch opening;
   one or more guide elements adapted to direct motion of the launch canister towards the water surface at a preferred launch angle; and
   a lanyard fixedly attached at one end to an external part of the launch canister and the lanyard having a second end adapted for detachable connection to a submerged launch platform, the launch canister being configured such that, when the launch canister is ejected from a submerged launch platform, the one or more guide elements move from a stowed to a deployed position on the lanyard pulling taut at a first extension of the lanyard, the first extension of the lanyard being such that the one or more guide elements are deployed when the launch canister fully exits the submerged launch platform.

18. The launch canister as claimed in claim 17, wherein the lanyard is configured to detach from the submerged launch platform when the lanyard is pulled taut at a second extension of the lanyard.

19. A method for launching an unmanned aerial device having an engine from a submerged launch platform, the method comprising:
   ejecting a launch canister carrying the unmanned aerial vehicle in an enclosure thereof in a direction substantially along a first axis of the launch canister,
   detecting a nose cap located in a launch opening of the enclosure of the launch canister broaching a water surface;
   in response to detecting the nose cap broaching the surface of the water, immediately releasing, by a nose cap release mechanism, the nose cap and initiating a launch mechanism to drive the unmanned aerial vehicle out of the enclosure through the launch opening; and
   driving, aided by momentum from the ejecting of the launch canister in the direction substantially along the first axis, the unmanned aerial vehicle out of the launch canister by the launch mechanism through the enclosure in the direction substantially along said first axis,
   wherein the launch canister includes a lanyard attached at a first end of the lanyard in the enclosure, the lanyard being detachably connected to the unmanned aerial vehicle, the lanyard having a length selected such that the lanyard pulls taut and detaches from the unmanned aerial vehicle as the engine of the unmanned aerial device passes through the launch opening,
   wherein a second end of the lanyard causes the engine of the unmanned aerial vehicle to power up when the lanyard is pulled taut and detaches from the unmanned aerial vehicle.

* * * * *